United States Patent Office 2,818,368
Patented Dec. 31, 1957

2,818,368

METHOD OF CONTROLLING NEMATODES EMPLOYING A PHOSPHONIUM HALIDE

Milton Kosmin, Dayton, Ohio, assignor to Monsanto Chemical Company, St. Louis, Mo., a corporation of Delaware No Drawing. Application August 18, 1955
Serial No. 529,314

6 Claims. (Cl. 167—30)

This invention relates to the control of endoparasitic and ectoparasitic worms which exist in the soil at some stage of their life cycles, for example, eggs, larvae and adult worms. The invention is particularly directed to methods of inhibiting and eradicating nematodes or eelworms, e. g., such as the root-node nematode, which attack subterranean plant development.

The control of nematodes and other parasitic worms in soil is a complex problem. These organisms, either in the egg, larvae or adult stage, are protected by a difficultly permeable membrane. Hence the effective toxicant must have both the property of penetrating the resistant coatings and the ability to kill. It must also be readily dispersible in soils or other environment of the organism and be stable when incorporated therein. Since the object of ridding soils of nematodes and parasites is to provide a beneficial growth media for plants, the nematocide or parasiticide must not be phytotoxic to plants, or, if phytotoxic, this effect must not be long-lived. Such a nematocide, either itself or some phytotoxic decomposition product thereof, should be such that, previous to planting, it is removed from the soil by evaporation, by rain washing or by soil bacterial decomposition.

For the reasons set forth above, completely effective agents for nematodes and other parasitic worm life are not generally available. Furthermore, one skilled in the art cannot predict the effectiveness of compounds as practicable toxicants, even though the physical and biological properties of the compounds are well known.

Since a very careful balance of physical and chemical properties is required in order to provide a chemical substance useful in controlling nematodes and other parasitic worms, this invention has for its principal purpose the provision of compounds which have the above-described requisite properties. A further purpose of this invention is to provide a useful method of freeing soils from objectionable nematode life. Other purposes of this invention will be evident from the following specification.

It has now been found that certain phosphonium halides are very effective as nematocides and as agents for controlling other parasitic worms. The presently useful compounds have the formula

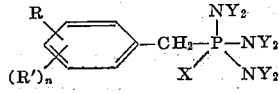

in which R is an alkyl radical of from 8 to 18 carbon atoms, R' is selected from the class consisting of hydrogen and alkyl radicals of from 1 to 4 carbon atoms, $n$ is an integer of from 1 to 2, Y is an alkyl radical of from 1 to 4 carbon atoms and X is halogen.

Compounds having the above general formula are readily obtained by contacting a hexaalkylphosphorous triamide in which the alkyl radical has from 1 to 4 carbon atoms with an appropriate benzyl halide as disclosed in the copending application of William T. Dye, Jr., Serial No. 485,585, now Patent No. 2,730,547, filed February 1, 1955.

Examples of benzyltris(dialkylamino)phosphonium halides having the above formula and useful for the present purpose are 2-, 3-, or 4-octylbenzyltris(dimethylamino)phosphonium chloride or bromide, 2-, 3-, or 4-(2-ethylhexyl)benzyltris(dimethylamino)phosphonium chloride or bromide, 2-, 3-, or 4-n-nonylbenzyltris(dimethylamino)phosphonium chloride, bromide or iodide, 2-, 3-, or 4-decylbenzyltris(dimethylamino)phosphonium chloride or bromide, 4-undecylbenzyltris(dimethylamino)phosphonium chloride or bromide, 2-, 3-, or 4-tert-dodecyl- or n - dodecylbenzyltris(dimethylamino)phosphonium chloride or bromide, 2-, 3-, or 4-tetradecylbenzyltris(dimethylamino)phosphonium chloride or iodide, 2-, 3-, or 4-octadecylbenzyltris(dimethylamino)phosphonium chloride or bromide, 2-octyl-3-propylbenzyltris(diethylamino)phosphonium chloride or iodide, 3,4-dimethyl-n-dodecyltris(dimethylamino)phosphonium chloride, bromide or iodide, ar-(2-butyloctyl)-ar-isopropylbenzyltris-(di-n-butylamino)phosphonium chloride or bromide, 4-(2 - n - propylheptyl)benzyltris(dimethylamino)phosphonium chloride or bromide, 3-(7-ethyl-2-methylundecyl)-benzyltris(dipropylamino)phosphonium chloride or bromide, ar-(2,4-diisobutyl-3-tridecylbenzyl)tris(dimethylamino)phosphonium chloride or iodide, ar-n-dodecyl-ar-dimethylbenzyltris(diethylamino)phosphonium chloride or bromide, and ar-alkylbenzyltris(dialkylamino)phosphonium halides in which the ar-long chain alkyl radical is derived from chlorinated kerosene or from alcohols obtained by hydrogenation of higher fatty acids or by the high pressure reaction of olefins with carbon monoxide and hydrogen according to the "Oxo" process.

As herein employed, the prefix ar throughout the specification and claims denotes substitution of the radical which it prefixes at an uncertain position of the aromatic nucleus.

The invention is further illustrated, but not limited, by the following examples:

*Example 1*

This example describes the nematocidal evaluation of a phosphonium halide obtained by the addition reaction of hexamethylphosphoroustriamide and a nuclearly alkylated benzyl chloride which was obtained by chloromethylating dodecylbenzene. The chloromethylation was effected by treatment of dodecylbenzene with a mixture of trioxymethylene and chlorosulfonic acid in the cold according to the procedure used by Raterink in his U. S. Patent No. 2,630,459, wherein he introduces the chloromethyl group into the aromatic nucleus. Since the aromatic position taken by the chloromethyl group is not known, the alkylbenzyl chloride used for the preparation of the presently employed phosphonium chloride is designated as ar-dodecylbenzylphosphonium chloride.

It is known that a nematode, when placed in water, flexes its body at a more or less constant rate and that the effect of a nematocide can be estimated with reasonable accuracy by counting the rate of these flexures.

The chloride was dissolved in a small quantity of acetone and the resulting solutions and an emulsifying agent (a sorbitan monolaurate polyoxzethylene derivative known to the trade as "Tween 20") were added to water to make up a 2 percent concentration of the chloride. The emulsifier was present in a concentration of less than about 1.0 percent. The resulting emulsion was then diluted with water to give an 0.2 percent concentration of the chloride.

Live nematodes (*Panagrellus redivivus*) were placed in a vessel of water and 2.5 mls. of the 0.2 percent emulsion of the chloride was added to the vessel. This corresponded to an 0.1 percent concentration of the chloride in the vessel of nematodes. The one vessel was held as a control.

Starting a timer as the emulsion of chloride was added to the nematode suspension, the organisms were examined by means of a stereoscopic-microscope at a magnification of about 10X and the motility estimated and recorded at timed intervals. The following table sets forth the motility of the nematodes as compared to the control culture:

| Motility after— | Culture Containing the Test Chloride at Percent Concentration | | Control Culture |
| --- | --- | --- | --- |
| | 0.1% | 0.01% | |
| 10 minutes | 15 | 80 | 100 |
| 20 minutes | 5 | 50 | 100 |
| 30 minutes | 1 | 50 | 100 |
| 60 minutes | 1 | 25 | 100 |
| 2 hours | 1 | 10 | 100 |
| 24 hours | 0 | 0 | 100 |

*Example 2*

This example shows testing of an ar-dodecyl-ar-methyl-benzyltris(dimethylamino)phosphonium chloride prepared by chloromethylating an ar-dodecyltoluene as in Example 1, and reaction of the ar-dodecyl-ar-methylbenzyl chloride thus obtained with hexamethylphosphoroustriamide. Testing was conducted according to the procedure described in the above example giving the following values:

| Motility after— | Culture Containing the Test Chloride at Percent Concentration | | Control Culture |
| --- | --- | --- | --- |
| | 0.1% | 0.01% | |
| 10 minutes | 20 | 75 | 100 |
| 20 minutes | 10 | 25 | 100 |
| 30 minutes | 5 | 15 | 100 |
| 60 minutes | 2 | 10 | 100 |
| 2 hours | 2 | 5 | 100 |
| 24 hours | 0 | 0 | 100 |

Nematocidal compositions comprising the present phosphonium halides are effective in eliminating or controlling nematode activity when applied to the soil at the rate of 50 to 600 lbs. per acre. Preferred level of application useful in soils of average infestation will be from 50 to 200 lbs. per acre.

Obviously, heavily infested areas may require the use of higher proportions and lightly infested areas may be treated effectively with smaller proportions. The compositions being water-dispersible may be applied by spraying on a cultivated field so as to permit penetration to a substantial depth. More effective methods of distribution of the nematocide may involve the introduction in irrigation water or by injection into the soil by a suitable jet following a plow or harrowing device. Other methods of treating soils with liquid compositions are adapted for use in the practice of this invention.

In addition to the use in soils, the invention may be practiced in any other nematode environment, for example, greenhouse potting mixtures and other soil substitutes. Nematode environments may include rooted plants, tubers, seeds and bulbs, in which case the toxicant is used as a rinse to remove and destroy eggs, larvae and adult nematodes which may be present.

The present quaternary nitrogen compounds are useful in destroying endoparasitic worms other than nematodes which frequently infect barnyards or other areas frequented by domestic animals and fowl. The treatment of the surface soils in such localities will minimize infections by flukes, tapeworms and other helminth parasites in the animals and fowl by destruction of eggs and larvae of the parasites during the soil phase of their life cycles.

What is claimed is:

1. The method of controlling endoparasitic worms which comprises applying to soils, plants and seeds susceptible to infestation by the worms a composition comprising a phosphonium halide of the formula

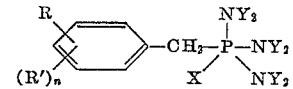

in which R is an alkyl radical of from 8 to 18 carbon atoms, R' is selected from the class consisting of hydrogen and alkyl radicals of from 1 to 4 carbon atoms, n is an integer of from 1 to 2, Y is an alkyl radical of from 1 to 4 carbon atoms and X is halogen.

2. The method of controlling nematodes which comprises applying to soils, plants and seeds susceptible to infestation by the worms a composition comprising a phosphonium halide of the formula

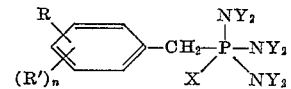

in which R is an alkyl radical of from 8 to 18 carbon atoms, R' is selected from the class consisting of hydrogen and alkyl radicals of from 1 to 4 carbon atoms, n is an integer of from 1 to 2, Y is an alkyl radical of from 1 to 4 carbon atoms and X is halogen.

3. The method of treating nematode-infested soil which comprises dispersing in the soil a toxic quantity of a phosphonium halide of the formula

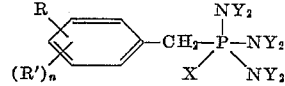

in which R is an alkyl radical of from 8 to 18 carbon atoms, R' is selected from the class consisting of hydrogen and alkyl radicals of from 1 to 4 carbon atoms, n is an integer of from 1 to 2, Y is an alkyl radical of from 1 to 4 carbon atoms and X is halogen.

4. The method of controlling nematodes which comprises applying to soils, plants and seeds susceptible to infestation by the worms a composition comprising an alkylbenzyltris(dimethylamino)phosphonium chloride having from 8 to 18 carbon atoms in the alkyl radical.

5. The method of treating nematode-infested soil which comprises dispersing in the soil a toxic quantity of ar-dodecylbenzyltris(dimethylamino)phosphonium chloride.

6. The method of treating nematode-infested soil which comprises dispersing in the soil a toxic quantity of ar - dodecyl - ar - methylbenzyltris(dimethylamino)phosphonium chloride.

References Cited in the file of this patent

UNITED STATES PATENTS 2,730,547    Dye    Jan. 10, 1956